(12) United States Patent
Mimura et al.

(10) Patent No.: US 6,911,486 B2
(45) Date of Patent: Jun. 28, 2005

(54) FLUORESCENT RETROREFLECTIVE SHEET

(75) Inventors: Ikuo Mimura, Uozu (JP); Akihiro Matsuda, Uozu (JP); Takashi Yoshioka, Namerikawa (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 690 days.

(21) Appl. No.: 09/980,703

(22) PCT Filed: Feb. 22, 2001

(86) PCT No.: PCT/JP01/01294

§ 371 (c)(1),
(2), (4) Date: Dec. 7, 2001

(87) PCT Pub. No.: WO01/77720

PCT Pub. Date: Oct. 18, 2001

(65) Prior Publication Data

US 2003/0100637 A1 May 29, 2003

(30) Foreign Application Priority Data

Apr. 11, 2000 (JP) ........................................ 2000-109425

(51) Int. Cl.$^7$ ................................................ F21V 7/22
(52) U.S. Cl. ..................... 523/172; 428/412; 428/423.1; 428/423.3; 428/500
(58) Field of Search .......................... 523/172; 428/412, 428/423.1, 423.3, 500

(56) References Cited

U.S. PATENT DOCUMENTS

| | | | |
|---|---|---|---|
| 2,310,790 A | 2/1943 | Jungersen | 88/105 |
| 2,380,447 A | 7/1945 | Jungersen | 88/78 |
| 2,481,757 A | 9/1949 | Jungersen | |
| 3,190,178 A | 6/1965 | McKenzie | |
| 3,712,706 A | 1/1973 | Stamm | 350/103 |
| 3,830,682 A | 8/1974 | Rowland | 161/2 |
| 4,025,159 A | 5/1977 | McGrath | 350/105 |
| RE29,396 E | 9/1977 | Heenan | 204/281 |
| 4,349,598 A | 9/1982 | White | 428/161 |
| 4,498,733 A | 2/1985 | Flanagan | 350/102 |
| 4,544,496 A | 10/1985 | Claussen et al. | 262/301.35 |
| 4,588,258 A | 5/1986 | Hoopman | 350/103 |
| 4,764,622 A | 8/1988 | Claussen et al. | 235/18 |
| 4,775,219 A | 10/1988 | Appeldorn et al. | 350/103 |
| 4,801,193 A | 1/1989 | Martin | 360/103 |
| 4,897,136 A | 1/1990 | Bailey et al. | 156/145 |
| 5,064,272 A | 11/1991 | Bailey et al. | 359/541 |
| 5,122,902 A | 6/1992 | Benson | 359/529 |
| 5,138,488 A | 8/1992 | Szczech | 359/529 |
| 5,264,063 A | 11/1993 | Martin | 168/247 |
| 5,376,431 A | 12/1994 | Rowland | 428/164 |

(Continued)

FOREIGN PATENT DOCUMENTS

| | | |
|---|---|---|
| DE | 29 34 541 | 4/1981 |
| EP | 0 042 090 | 6/1981 |
| EP | 0 137 736 | 4/1985 |
| EP | 0 175 031 | 3/1986 |
| EP | 0 548 280 | 6/1993 |
| EP | 96/10197 | 4/1996 |
| EP | 0 830 621 | 11/2001 |
| EP | 1 164 390 | 12/2001 |
| GB | 441319 | 12/1933 |
| JP | 63-143502 | 6/1988 |
| JP | 11-305017 | 11/1999 |
| WO | 92/04647 | 3/1992 |
| WO | WO 94/14091 | 6/1994 |
| WO | WO 95/11463 | 4/1995 |
| WO | WO 95/11465 | 4/1995 |
| WO | WO 95/11470 | 4/1995 |

*Primary Examiner*—Edward J. Cain
(74) *Attorney, Agent, or Firm*—Fitzpatrick, Cella, Harper & Scinto

(57) ABSTRACT

This invention provides encapsulated type fluorescent retroreflective sheeting which is excellent in appearance and weatherability, and which comprises a surface-protective layer disposed on the side on which light is to strike, a binder layer connected to the surface-protective layer through network bonding parts, an air layer which is sealed-up by the network bonding parts between the surface-protective layer and the binder layer, and a retroreflective element layer disposed between the surface-protective layer and the air layer, or between the binder layer and the air layer, wherein at least one layer located on the light-incident side of sealed-up air layer contains at least one fluorescent dye selected from the group consisting of benzimidazole coumarin type-fluorescent dyes of formula (1) as follows:

(1)

and benzopyran type-fluorescent dyes of formula (2) as follows:

(2)

12 Claims, 2 Drawing Sheets

U.S. PATENT DOCUMENTS

| | | | |
|---|---|---|---|
| 5,557,836 A | 9/1996 | Smith et al. | 29/527.4 |
| 5,564,870 A | 10/1996 | Benson et al. | 409/131 |
| 5,600,484 A | 2/1997 | Benson et al. | 359/529 |
| 5,601,911 A | 2/1997 | Ochi et al. | 428/304.4 |
| 5,672,643 A | 9/1997 | Burns et al. | 524/90 |
| 5,696,627 A | 12/1997 | Benson et al. | 359/529 |
| 5,706,132 A | 1/1998 | Nestegard et al. | 359/529 |
| 5,721,640 A | 2/1998 | Smith et al. | 359/530 |
| 5,764,413 A | 6/1998 | Smith et al. | 359/530 |
| 5,831,767 A | 11/1998 | Benson et al. | 359/529 |
| 5,840,405 A | 11/1998 | Shusta et al. | 428/156 |
| 5,840,406 A | 11/1998 | Nilsen | 428/156 |
| 5,844,712 A | 12/1998 | Caroli | 359/529 |
| 5,854,709 A | 12/1998 | Couzin | 359/529 |
| 5,889,615 A | 3/1999 | Dreyer | 359/515 |
| 5,898,523 A | 4/1999 | Smith et al. | 359/530 |
| 5,914,812 A | 6/1999 | Benson et al. | 359/529 |
| 5,981,032 A | 11/1999 | Smith et al. | 428/167 |
| 5,988,820 A | 11/1999 | Huang et al. | 359/530 |
| 6,036,322 A | 3/2000 | Nilsen et al. | 359/529 |
| 6,083,607 A | 7/2000 | Mimura et al. | 428/167 |
| 6,120,280 A | 9/2000 | Mimura et al. | 425/195 |
| 6,155,689 A | 12/2000 | Smith | 359/530 |
| 6,206,525 B1 | 3/2001 | Rowland et al. | 359/530 |
| 6,390,629 B1 | 5/2002 | Mimura et al. | 359/530 |

FLUORESCENT RETROREFLECTIVE SHEET

TECHNICAL FIELD

The present invention relates to novel fluorescent retroreflective sheeting. In more detail, this invention relates to novel fluorescent retroreflective sheeting which contains a fluorescent dye of specific structure.

In particular, this invention relates to novel fluorescent retroreflective sheeting which is constituted of cube-corner retroreflective elements or micro glass beads retroreflective elements, and which is useful for signs including traffic signs and construction work signs, license plates of automobiles and motorcycles, safety materials of clothing and life preservers, markings of signboards, and reflectors for visible-light-, laser-beam- or infrared-ray-reflective sensors.

BACKGROUND ART

Retroreflective sheeting for reflecting incoming light toward light source has been well known, and such sheeting with use of its retroreflective characteristics has been widely applied in the above-mentioned fields.

Generally, basic optical properties which are required of retroreflective sheeting include both high brightness in night time, i.e., the intensity of reflective brightness represented by reflective brightness against light which is being frontally incoming toward said sheeting, and wide angularity. With regard to wide angularity, there are demanded three properties, i.e., observation angularity, entrance angularity and rotational angularity. Good visibility of sheeting in day time is also required.

There have been reported some methods to improve the visibility of retroreflective sheeting in day time. A known one among them is to give fluorescent appearance by means of including fluorescent dye in some layer or other of retroreflective sheeting.

U.S. Pat. No. 3,830,682 of Rowland, for instance, discloses that fluorescent retroreflective sheeting of clear color tone is produced by compounding fluorescent dye such as Rhodamine B Extra, Rhodamine 6DGN, Fluorol 7GN and Amaplast Orange LFP in prism layer of triangular-pyramidal cube-corner retroreflective sheeting.

U.S. Pat. No. 5,387,458 of Pavalka discloses fluorescent retroreflective sheeting of clear color tone which is constituted of a screen layer which absorbs ultraviolet ray although substantially transparent to visible light, and of triangular-pyramidal cube-corner retroreflective sheeting elements layer to which thioindigoid type-, thioxanthene type-, benzoxazole coumarin type- or perylene imide type-dye has been added.

U.S. Pat. No. 5,605,761 of Burns discloses fluorescent retroreflective sheeting of clear color tone wherein thioxanthone type-, perylene imide type- or thioindigoid type-fluorescent dye and hindered amine type light stabilizer have been added to triangular-pyramidal cube-corner retroreflective elements layer.

U.S. Pat. No. 5,672,643 of Burns discloses fluorescent retroreflective sheeting of color tone in a specific range wherein retroreflective elements layer of cube-corner retroreflective sheeting contains a combination of perylene imide type-fluorescent dye of a specific structure with a specific fluorescent dye which is selected from Lumogen F Yellow 083, CI Solvent Yellow 160:1, CI Solvent Green 4, CI Pigment Yellow 101, CI Solvent Yellow 131, CI Solvent Yellow 98, Oraset Yellow 8GF, CI Solvent Green 5 and Golden Yellow D304.

None of the fluorescent retroreflective sheeting which has been proposed in the above-mentioned patents simultaneously satisfies both requirements of excellent fluorescent appearance and weatherability to maintain fluorescent color.

Inventors of the present invention have made assiduous study about fluorescent dye which is usable for retroreflective sheeting, and which has both properties of excellent fluorescent appearance and weatherability to maintain fluorescent color for a long period of time. As a result, they have found out that a certain kind of benzimidazole coumarin type- and benzopyran type-fluorescent dyes have both of the above-mentioned properties, and have thus completed this invention.

DISCLOSURE OF INVENTION

This invention provides encapsulated type fluorescent retroreflective sheeting which comprises a surface-protective layer disposed on the side on which light is to strike, a binder layer connected to the surface-protective layer through network bonding parts, an air layer which is sealed-up by the network bonding parts between the surface-protective layer and the binder layer, and a retroreflective element layer disposed between the surface-protective layer and the air layer, or between the binder layer and the air layer, wherein at least one layer located on the light-incident side of sealed-up air layer contains at least one fluorescent dye selected from the group consisting of benzimidazole coumarin type-fluorescent dyes of formula (1) as follows:

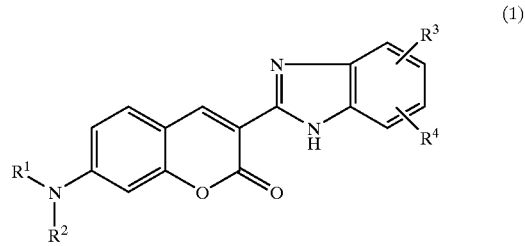

(1)

wherein $R^1$ and $R^2$ each denote hydrogen atom, alkyl group, allyl group, cycloalkyl group, cyclohexylphenyl group or alkylphenyl group; and $R^3$ and $R^4$ each denote hydrogen atom, halogen atom, alkyl group or alkoxy group, and benzopyran type-fluorescent dyes of formula (2) as follows:

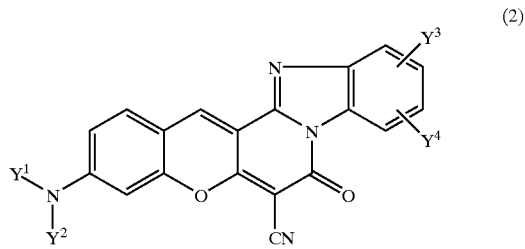

(2)

wherein $Y^1$ and $Y^2$ each denote hydrogen atom, cyano group, alkyl group, alkoxy group, allyl group, allyloxy group, carboalkoxy group, acetoxy-substituted alkyl group, cycloalkyl group or phenyl group; and $Y^3$ and $Y^4$ each denote hydrogen atom, halogen atom, alkoxy group, cyano group or nitro group.

DETAILED DESCRIPTION OF INVENTION

Figure 1:
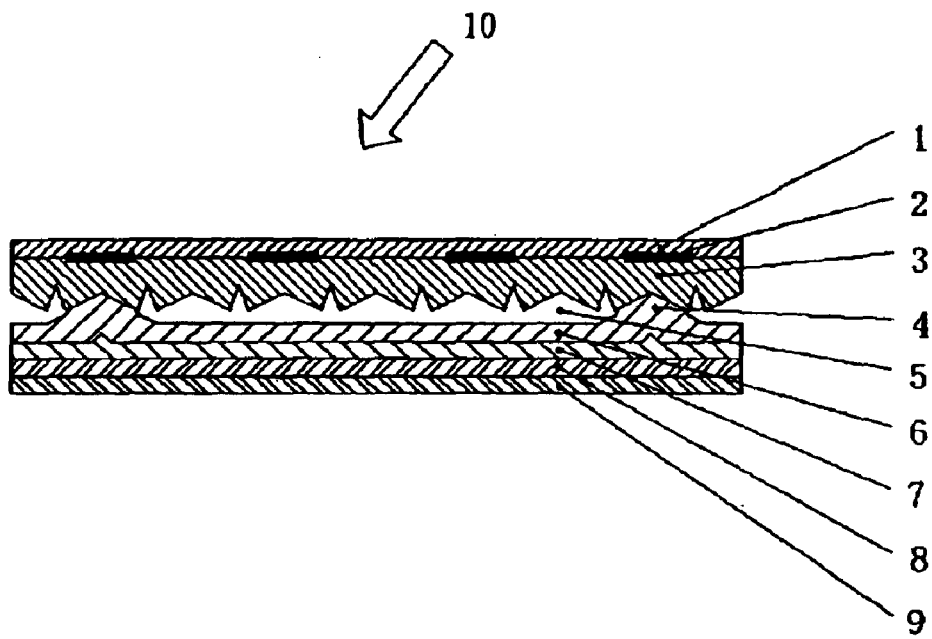
FIG. 1 is a cross section of fluorescent retroreflective sheeting of this invention whose retroreflective element layer is constituted of cube-corner type retroreflective elements.

In the following, the fluorescent retroreflective sheeting of this invention is explained in more detail.

This invention gives fluorescent color to encapsulated type fluorescent retroreflective sheeting which comprises a surface-protective layer disposed on the side on which light is to strike, a binder layer connected to the surface-protective layer through network bonding parts, an air layer which is sealed-up by the network bonding parts between the surface-protective layer and the binder layer, and a retroreflective element layer disposed between the surface-protective layer and the air layer, or between the binder layer and the air layer, by means of including benzimidazole coumarin type-fluorescent dye of formula (1) and/or benzopyran type-fluorescent dye of formula (2) in a layer located on the light-incident side of sealed-up air layer.

There is no special restriction on the constitution of encapsulated type fluorescent retroreflective sheeting to which fluorescent color is to be given in accordance with this invention, so long as said sheeting is basically constituted in the above-mentioned manner. This invention is applicable to any known retroreflective sheeting.

Benzimidazole coumarin type-fluorescent dye of formula (1) with which to give fluorescent color to retroreflective sheeting may be any known one [see Japanese Patent Application Publication No. Sho 42 (1967)-23606 (=U.S. Pat. No. 3,458,880; DE-B-1,469,770)]. Examples of this dye are shown as follows:

TABLE 1

(1)

[Structure of formula (1)]

| Compound No. | $R^1$ | $R^2$ | $R^3$ | $R^4$ |
|---|---|---|---|---|
| 1-1 | $C_4H_9$ | $C_4H_9$ | H | $CH_3$ |
| 1-2 | $C_2H_5$ | $C_2H_5$ | H | $SO_2CH_3$ |
| 1-3 | $C_2H_5$ | $C_2H_5$ | H | H |

TABLE 1-continued (1)

[Structure of formula (1)]

| Compound No. | $R^1$ | $R^2$ | $R^3$ | $R^4$ |
|---|---|---|---|---|
| 1-4 | $CH_2$—[phenyl] | $CH_3$ | H | H |
| 1-5 | $C_2H_5$ | $C_2H_5$ | H | Br |

Among the above, a yellow fluorescent dye of formula (1) wherein $R^1$ and $R^2$ each denote ethyl group and $R^3$ and $R^4$ each denote hydrogen atom is in particular suitable for this invention. This dye is on the market under a tradename of "Kayaset SF-G" (manufactured by Nihon Kayaku K.K.), "Sumikaron Brilliant Flavine 8GFF" (manufactured by Sumitomo Kagaku Kogyo K.K.), etc.

Benzopyran type-fluorescent dye of formula (2) with which to give fluorescent to retroreflective sheeting may also be any known one [see Japanese Patent Application Publication No. Sho 62 (1987)-12822, Japanese Patent Application Publication No. Sho 61 (1986)-58099, Japanese Patent Application Laid-Open (Kokai) No. Sho 57 (1982)-31958]. Examples of this dye are shown as follows:

TABLE 2

(2)

[Structure of formula (2)]

| Compound No. | $Y^1$ | $Y^2$ | $Y^3$ | $Y^4$ |
|---|---|---|---|---|
| 2-5 | $H_2C=CH—CH_2$ | $H_2C=CH—CH_2$ | H | $—OCH_3$ |
| 2-1 | $H_2C=CH—CH_2$ | $H_2C=CH—CH_2$ | H | H |
| 2-2 | $C_2H_5$ | $C_2H_5$ | Cl | Cl |
| 2-3 | $C_2H_4OCH_3$ | $C_2H_4OCH_3$ | Cl | Cl |
| 2-4 | $H_2C=CH—CH_2$ | $H_2C=CH—CH_2$ | Cl | Cl |

Among the above, a red fluorescent dye of formula (2) wherein $Y^1$ and $Y^2$ each denote allyl group and $Y^3$ and $Y^4$ each denote hydrogen atom is in particular suitable for this invention. This dye is on the market under a tradename of "Kayaset SF-B" (manufactured by Nihon Kayaku K.K.).

The amount of the above-mentioned fluorescent dye of formula (1) or (2) is not strictly limited, but may be varied in a broad range according to the use of the retroreflective sheeting of this invention or according to the desired degree of fluorescence. Usually, however, it is preferably within a range of 0.01 to 0.5 PHR, in particular 0.02 to 0.4 PHR.

In the encapsulated type retroreflective sheeting of this invention, benzimidazole coumarin type-fluorescent dye of formula (1) and benzopyran type-fluorescent dye of formula (2) may each be used either singly or in combination of two kinds or more, or, furthermore, in combination with other fluorescent dye or non-fluorescent dye or with pigment.

Retroreflective layer and/or surface-protective layer and/or fluorescent dye-containing layer of the retroreflective sheeting of this invention may, if necessary, include ultraviolet absorber for the purpose of improving weatherability etc. Examples of ultraviolet absorber which may be contained are as follows:

Hydroquinone Type:
Hydroquinone, hydroquinone disalicylate, etc.
Salicylic Acid Type:
Phenyl salicylate, paraoctylphenyl salicylate, etc.
Benzophenone Type:
2-Hydroxy-4-methoxybenzophenone;
2-hydroxy-4-n-octoxybenzophenone;
2-hydroxy-4-methoxy-2'-carboxybenzophenone;
2,4-dihydroxybenzophenone;
2,2'-dihydroxy-4,4'-dimethoxybenzophenone;
2-hydroxy-4-benzoyloxybenzophenone;
2,2'-dihydroxy-4-methoxybenzophenone;
2-hydroxy-4-methoxy-5-sulfonbenzophenone;
2,2',4,4'-tetrahydroxy-benzophenone;
2,2'-dihydroxy-4,4'-dimethoxy-5-sodium sulfobenzophenone;
4-dodecyloxy-2-hydroxybenzophenone;
2-hydroxy-5-chlorobenzophenone; etc.
Benzotriazole Type:
2-(2'-Hydroxy-5'-methylphenyl)benzotriazole;
2-(2'-hydroxy-5'-methylphenyl)-5-butylcarboxylate benzotriazole;
2-(2'-hydroxy-5'-methylphenyl)-5,6-dichlorobenzotiazole;
2-(2'-hydroxy-5'-methylphenyl)-5-ethylsulfonbenzotriazole;
2-(2'-hydroxy-5'-tert-butylphenyl)-5-chlorobenzotrizole;
2-(2'-hydroxy-5'-tert-butylphenyl)benzotriazole;
2-(2'-hydroxy-5'-amylphenyl)benzotriazole;
2-(2'-hydroxy-3',5'-dimethylphenyl)-5-methoxybenzotriazole;
2-(2'-methyl-4'-hydroxyphenyl)benzotriazole;
2-(2'-stearyloxy-3',5'-dimethylphenyl)-5-methylbenzotriazole;
2-(2'-hydroxy-5-phenylcarboxylate)benzotriazole ethylester;
2-(2'-hydroxy-3'-methyl-5'-tert-butylphenyl)benzotriazole;
2-(2'-hydroxy-3',5'-di-tert-butylphenyl)-5-chlorobenzotriazole;
2-(2'-hydroxy-5-methoxyphenyl)benzotriazole;
2-(2-hydroxy-5'-phenylphenyl)-5-chlorobenzotriazole;
2-(2'-hydroxy-5'-cyclohexylphenyl)benzotriazole;
2-(2'-hydroxy-4',5'-dimethylphenyl)5-butylbenzotriazole carboxylate;
2-(2'-hydroxy-3',5'-dichlorophenyl)benzotriazole;
2-(2'-hydroxy-4',5'-dichloro)benzotriazole;
2-(2'-hydroxy-3',5'-dimethylphenyl)-5-ethylsulfon benzotriazole;
2-(2'-hydroxy-5'-phenylphenyl)benzotriazole;
2-(2'-hydroxy-4'-octoxyphenyl)benzotriazole;
2-(2'-hydroxy-5'-methoxyphenyl)-5-methylbenzotriazole,
2-(2'-hydroxy-5'-methylphenyl)-5-benzotriazole carboxylate,
2-(2'-acetoxy-5'-methylphenyl)benzotriazole;
2-(2'-hydroxy-3',5'-di-tertbutylphenyl)-5-chlorobenzotriazole; etc.

Cyano Acrylate Type:
2-Cyano-3,3-diphenylethylacrylate;
2-cyano-3,3-diphenylacrylate 2-ethylhexyl; etc.

Among the above-recited ultraviolet absorbers, those of benzophenone type and of benzotriazole type are suitable. In particular, 2,3'-dihydroxy-4,4'-dimethoxybenzophenone; 2,2'-dihydroxy-4-methoxybenzophenone; and 2,2',4,4'-tetrahydroxy-benzophenone are effective among benzophenone type. In benzotriazole type, 2-(2'-hydroxy-5'-methylphenyl)benzotriazole; 2-(2'-hydroxy-5-methylphenyl)-5,6dichlorobenzotriazole; 2-(2-hydroxy-5'-tert-butylphenyl)benzotriazole; 2-(2'-hydroxy-3'-methyl-5'-tert-butylphenyl)benzotriazole; 2-(2'-hydroxy-3',5'-di-tertbutylphenyl)-5-chlorobenzotriazole; 2-(2'-hydroxy-5'-phenylphenyl)-5-chlorobenzotriazole; 2-(2'-hydroxy-5'-octoxyphenyl)benzotriazole; etc are effective.

As ultraviolet absorbers on the market, those of benzotriazole type or of benzophenone type are usable. Examples of ultraviolet absorbers of benzotriazole type include Sea Sorb 701, 702, 708, 704, 706 and 709 manufactured by Cypro Kasei K.K.; Adeka Stab LA31 and LA32 manufactured by Asahi Denka Kogyo K.K.; Sumi Sorb 250 manufactured by Sumitomo Kagaku K.K.; and Bio Sorb 590 manufactured by Kyodo Yakuhin K.K.; etc. Examples of benzophenone type include Adeka Stab 1413 and LA51 manufactured by Asahi Denka K.K.; Sea Sorb 101 and 103 manufactured by Cypro Kasei K.K.; and Sumi Sorb 110S manufactured by Sumitomo Kagaku K.K.; etc.

These ultraviolet absorbers are preferably added in an amount of usually 0.01 to 2 PHR, especially 0.01 to 1 PHR, more desirably 0.01 to 0.95 PHR.

If necessary, for the purpose of improving weatherability etc., a hindered amine light stabilizer may be included in a fluorescent dye-containing layer of the retroreflective sheeting of this invention. For such use, a piperidine type hindered amine light stabilizer of tertiary amine structure which has a molecular weight of at least 600 is in particular preferable since it keeps weatherability. As examples of usable hindered amine light stabilizer, those having the following structural formulae can be mentioned.

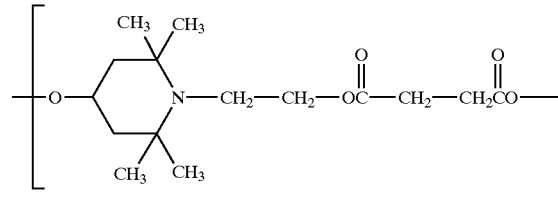

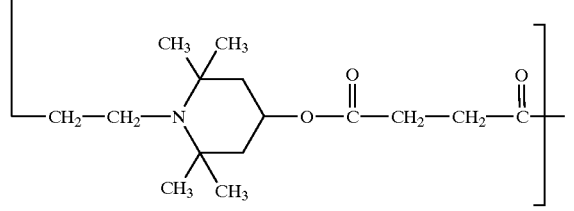

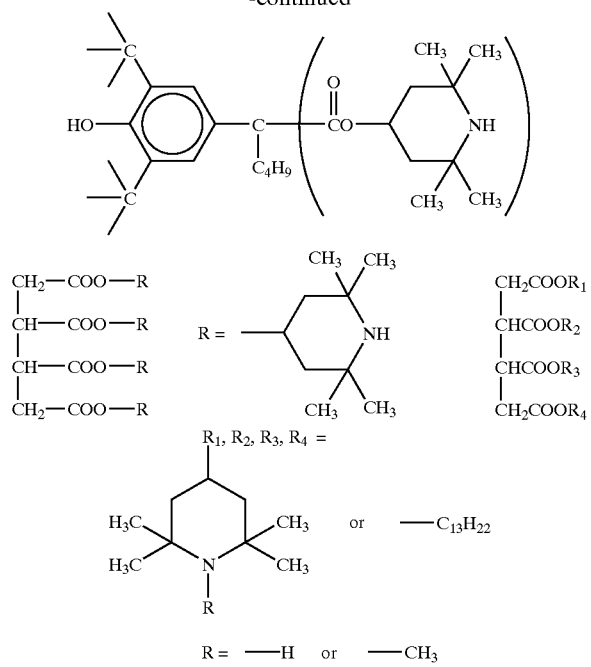

Examples of hindered amine light stabilizer on the market include Cinubin 622LD, 765, 144, Kimasorb 119FL manufactured by Nihon Ciba Geigy K.K.; Adeka Stab LA52 and LA62 manufactured by Asahi Denka Kogyo K.K.; and Sanol LS2626 manufactured by Sankyo K.K.

These hindered amine light stabilizers may be included in a fluorescent dye-containing layer, usually in an amount of 0 to 1 PHR, preferably 0.1 to 1 PHR, especially desirably 0.2 to 0.8 PHR, either singly or in combination with ultraviolet absorber or antioxidant.

The above-mentioned light stabilizers can be introduced, in the form of ester with (meth)acrylic acid, into skeleton of resin which constitutes a fluorescent dye-containing layer As examples of such reactive type light stabilizers, there can be mentioned 1,2,2,6,6-pentamethylpiperidyl methacrylate and 2,2,6,6-tetramethylpiperidyl methacrylate. When copolymerized with other resin-constituent reactive monomers such as (meth)acrylates, vinyl acetate and vinyl chloride, these light stabilizers is capable of introducing a group of light stabilizer into resin skeleton.

With a view to giving weatherability, benzoate type light stabilizer may be compounded in a fluorescent dye-containing layer. Examples of usable benzoate type light stabilizer include benzoate type quencher such as Cinubin 120 (trademark) manufactured by Nihon Ciba Geigy K.K.

In the following, the fluorescent retroreflective sheeting of this invention is explained in more detail, with reference to drawings if necessary.

First, the retroreflective sheeting of this invention is explained with respect to an embodiment of suitable structure of cube-corner type retroreflective sheeting, with reference to FIG. 1 which is a cross section thereof.

In FIG. 1, (3) shows retroreflective element layer in which triangular-pyramidal cube-corner type retroreflective elements are arranged in a closest-packing manner. Depending on the purpose of use of retroreflective sheeting and on circumstances under which to use retroreflective sheeting, there may be provided, on this retroreflective element layer (3), a surface-protective layer (1), a printed layer (2) for the purpose of conveying information to observer or of sheet coloring, a binder layer (6) for forming a sealing structure to prevent moisture from penetrating the back side of retroreflective element layer (3), a supporter layer (7) to support the binder layer (6), and an adhesive layer (8) and a releasing liner (9) by which to stick said retroreflective sheeting on another construct (For further details, see WO98/18028 for instance).

Printed layer (2) is usually disposed either between surface-protective layer (1) and retroreflective element layer (3), or on surface-protective layer (1) or on the reflection side of retroreflective element layer (3), by means of gravure printing, screen printing or ink jet printing.

Cube-corner type retroreflective elements layer (3) may be constituted of polycarbonate resin, acrylic resin, vinyl chloride resin or urethane resin. This retroreflective elements layer (3) may contain, with a view to improving weatherability, an additive such as an ultraviolet absorber, a light stabilizer and an oxidation inhibitor, each added either singly or in combination. There may also be contained, as a coloring agent, various kinds of organic pigments, inorganic pigments, fluorescent pigments, non-fluorescent dyes, and fluorescent dyes other than those of the above-mentioned formulae (1) and (2).

Surface-protective layer (1) may be made of the same resin as used for retroreflective elements layer (3), and may contain, with a view to improving weatherability, an additive such as an ultraviolet absorber, a light stabilizer and an oxidation inhibitor, each added either singly or in combination. There may also be contained, as a coloring agent, various kinds of organic pigments, inorganic pigments, fluorescent pigments, non-fluorescent dyes, and fluorescent dyes other than those of the above-mentioned formulae (1) and (2). Surface-protective layer (1) may be divided into two or more layers, in which case each of the layers may contain the above-mentioned various kinds of additives and coloring agents either singly or in combination.

The material with which to constitute retroreflective elements layer (3) is not restricted in particular, so long as it satisfies flexibility which is one of objectives of this invention. Generally, however, said material preferably has optical transparency and uniformity. Examples of material to constitute retroreflective elements layer (3) include polycarbonate resin, vinyl chloride resin, (meth)acrylic resin, epoxy resin, styrene resin, polyester resin, fluoroplastic, olefin resin such as polyethylene resin and polypropylene resin, cellulose resin and urethane resin, among which polycarbonate resin, (meth)acrylic resin, vinyl chloride resin and urethane resin are preferable.

In order to satisfy the condition of total internal reflection, a retroreflective elements layer (3) has generally an air layer (5) disposed on the back side of cube-corner type retroreflective elements. With a view to preventing the occurrence of inconveniences such as decrease in critical angle and the corrosion of metal layer which are caused by moisture penetration under use conditions, a retroreflective elements layer (3) and a binder layer (6) are preferably sealed with network bonding parts (4).

As methods for this sealing, there may be employed those which are disclosed in U.S. Pat. Nos. 3,190,178, 4,025,159, and in Japanese Utility Model Application Laid-Open No. Sho 50 (1975)-28669, etc. Examples of resins which are used for the preparation of a binder layer (6) include (meth)acrylic acid, polyester resin, alkyd resin and epoxy resin. Bonding parts (4) may be formed by embossing. Retroreflective elements layer (3) and a binder layer (6) may be sealed by any known method, which is to be selected appropriately from heat-fusible resin sealing method, thermosetting resin sealing method, ultraviolet-curing resin sealing method and electron rays-curing resin sealing method.

Binder layer (6) which is used for this invention may be formed either over the whole surface of supporter layer (7) or selectively on the parts of connection with retroreflective elements layer (3), i.e., on the bonding parts (4), by means of a method such as printing.

Examples of material to constitute supporter layer (7) include film which is made of the same resin as constitutes retroreflective elements layer (3) or which comprises general film-formable resin, or plate, fiber, cloth, foil or plate of metal such as stainless steel and aluminum, which are to be used either singly or as a complex.

As an adhesive layer (8) and a releasing liner (9) by which to stick the retroreflective sheeting of this invention on metal plate, wood plate, glass plate or plastic plate, any known one may be selected appropriately. An adhesive for adhesive layer (8) may be chosen from pressure-sensitive adhesive, heat-sensitive adhesive and cross-linking type adhesive. Examples of pressure-sensitive adhesive include a polyacrylic acid ester self-adhesive which is prepared by the copolymerization of acrylic acid ester such as butyl acrylate, 2-ethylhexyl acrylate, isooctyl acrylate and nonyl acrylate, with acrylic acid or vinyl acetate; a silicone resin self-adhesive; and rubber type self-adhesive. As heat-sensitive adhesive, there may be used one which comprises acrylic-, polyester type- or epoxy type-resin.

According to this invention, in a cube-corner type retroreflective sheeting which has the above-mentioned constitution, at least one fluorescent dye which is selected from benzimidazole coumarin type-fluorescent dye of the foregoing formula (1) and benzopyran type-fluorescent dye of formula (2) is compounded in the afore-mentioned manner, together with ultraviolet absorber and/or light stabilizer if necessary, in a layer located on the light-incident side (which is indicated by arrow mark 10 in FIG. 1) of sealed-up air layer (5), i.e., in at least one layer of surface-protective layer (1), printed layer (2) and retroreflective element layer (3), preferably retroreflective element layer (3), and, thus, there is obtained a cube-corner type fluorescent retroreflective sheeting which is excellent both in fluorescent appearance and in weatherability of fluorescent color.

The above-mentioned fluorescent dyes may be kneaded with resin and melted, or may be dispersed in a resin mix liquid and then dissolved, or may be first dissolved with a solvent and then mixed in a resin mix liquid, and are thus compounded in the above-mentioned layer, e.g., retroreflective element layer.

The fluorescent dyes may be dispersed uniformly on a layer such as retroreflective element layer. Otherwise, a said fluorescent dye-containing fluorescent-colored resin film which has been prepared separately may be superposed on surface-protective layer or on retroreflective element layer. Furthermore, one side of surface-protective layer or of retroreflective element layer may be coated with a said fluorescent dye-containing resin solution which has been prepared separately.

Next, an embodiment of another suitable structure of micro glass heads type retroreflective sheeting is explained with reference to FIG. 2 which is a cross section thereof.

Figure 2:
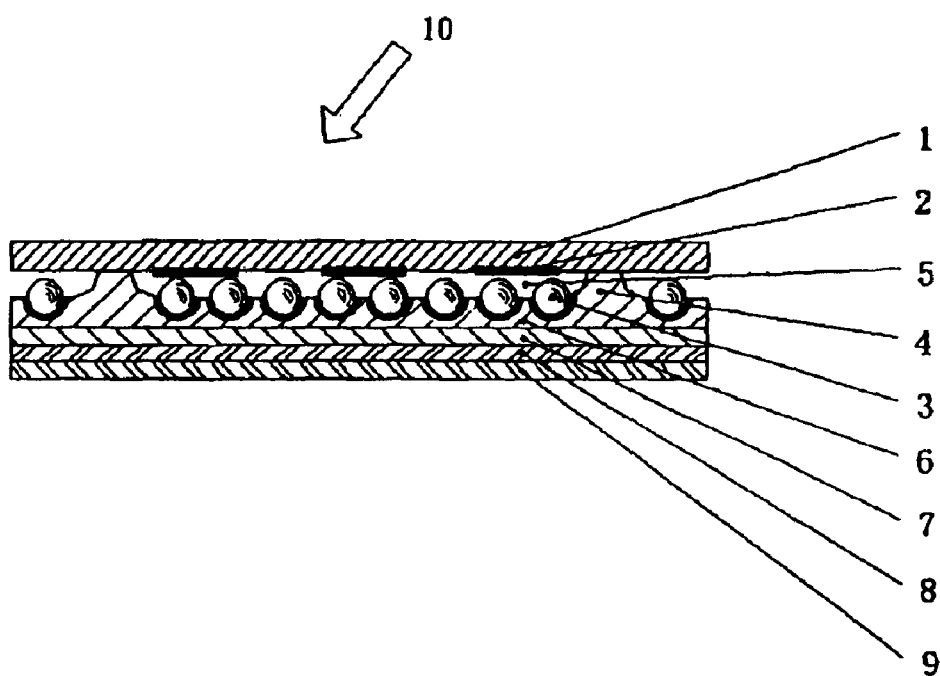
FIG. 2 is a cross section of fluorescent retroreflective sheeting of this invention whose retroreflective element layer is constituted of micro glass beads type retroreflective elements.

In FIG. 2, (3) shows retroreflective element layer on which micro glass beads type retroreflective elements, a part of whose glass beads has been mirror-finished, are arranged in a closest-packing manner. Depending on the purpose of use of retroreflective sheeting and on circumstances under which to use retroreflective sheeting, there may be provided, on this retroreflective element layer (3), a surface-protective layer (1), a printed layer (2) for the purpose of conveying information to observer or of sheet coloring, a binder layer (6) for forming a sealing structure to prevent moisture from penetrating the back side of retroreflective element layer (3), a supporter layer (7) to support the binder layer (6), and an adhesive layer (8) and a releasing liner (9) by which to stick said retroreflective sheeting on another construct. [For further details, see Japanese Patent Application Laid-Open No. Hei 8 (1996)-86910 (=U.S. Pat. No. 5,824,390; EP-A-693 697)].

Each layer which constitutes this micro glass beads type retroreflective sheeting may be made of the same material as mentioned above with regard to corresponding layers of cube-corner type retroreflective sheeting.

According to this invention, in a micro glass beads type retroreflective sheeting which is shown by this FIG. 2, at least one fluorescent dye which is selected from benzimidazole coumarin type-fluorescent dye of the foregoing formula (1) and benzopyran type-fluorescent dye of formula (2) is compounded in the above-mentioned manner, together with ultraviolet absorber and/or light stabilizer if necessary, in at least one layer located on the light-incident side (which is indicated by arrow mark 10 in FIG. 2) of sealed-up air layer (5), i.e., in surface-protective layer (1) and/or printed layer (2), in the same manner as in cube-corner type retroreflective sheeting, and, thus, there is obtained a micro glass beads type fluorescent retroreflective sheeting which is excellent both in fluorescent appearance and in weatherability of fluorescent color.

In the following, this invention is explained in more detail by means of working examples.

EXAMPLE 1

With use of Henschel mixer, a high-speed rotation type mixer manufactured by Mitsui Kozan K.K., there were mixed 100 parts by weight of "Upiron H3000", a bisphenol type polycarbonate resin manufactured by Mitsubishi Engineering Plastic K.K., 0.1 part by weight of "Kayaset SF-B", a benzopyran type red fluorescent dye manufactured by Nihon Kayaku K.K., 0.1 part by weight of "Kayaset SF-G", a benzimidazole coumarine type yellow fluorescent dye manufactured by the same, and 0.5 part by weight of "SanolLS2626", a tetramethyl piperidine type hindered amine manufactured by Sankyo K.K., under a condition of 100 rpm for 15 minutes.

Thus produced resin mixture was extruded from nozzle having a bore of 4 mm under a condition of extrusion temperature of 240° C. and rotation of 35 rpm, with use of a monoaxial extruder provided with a screw having a ratio of screw length to bore of 30:1 and a compression rate of 3.0. Thus extruded resin mixture was water-cooled and cut, and, in this manner, there were obtained colored pellets.

These colored pellets were dried under a condition of 80° C. for 12 hours, and were then extruded under a condition of extrusion temperature of 240° C. and rotation of 50 rpm, with use of a monoaxial extruder provided with a screw having a ratio of screw length to bore of 30:1 and a compression rate of 3.0, and, thus, there was obtained polycarbonate resin sheeting having a thickness of 200 μm.

On the surface layer of this colored polycarbonate resin film, there was superposed an 50 μm-thick acrylic resin film ("Sundulen 007" manufactured by Kanegafuichi Kagaku Kogyo K.K.) by heat adhesion method with use of a pair of heat rolls set at 200° C. Thereafter, the resultant sheeting was subjected to compression molding with use of a mold which was provided, on its surface, with triangular-pyramidal type retroreflective elements, under a condition of molding temperature of 200° C. and molding pressure of 50 kg/cm², in such a manner that polycarbonate resin was kept in contact with mold surface. After temperature was lowered to 30° C. under pressure, resin sheeting was taken out, and, thus, there was obtained polycarbonate resin-made fluorescent triangular-pyramidal type cube-corner retroreflective sheeting which was provided, on its surface, with a large number of triangular-pyramidal type retroreflective elements in a closest-packing manner.

Separately, "Byron GA2310", a polyester resin type hot-melt adhesive manufactured by Toyo Boseki K.K., was applied and superposed by extrusion method, in a thickness of 35 μm, on 38 μm-thick white polyethylene terephthalate film manufactured by Diafoil Hoechst Co., and, thus, there was formed a binder-laminated supporter layer film.

The above-mentioned triangular-pyramidal type cube-corner retroreflective sheeting and binder-laminated supporter layer film were passed through a molding roll provided with net-work protrusions and a silicone roll, and, thus, there was obtained encapsulated type fluorescent cube-corner type retroreflective sheeting.

COMPARATIVE EXAMPLE 1

"Diamond Grade #3924" (fluorescent orange color), a fluorescent cube-corner type retroreflective sheeting on the market manufactured by Sumitomo 3M K.K., was prepared as a comparative example.

The above-mentioned fluorescent cube-corner type retroreflective sheeting was measured for color clarity and weatherability by the following method.
[Method for Measurement of Reflection Spectrum]

With use of a double-beam type spectrophotometer CMS-35MXII provided with concave diffraction grating manufactured by Murakami Shikisai Gijutsu Kenkyujo K.K., there was determined reflection spectrum in a wave-length range for measurement of 390 to 730 nm and at a wave-length interval of 10 nm, by use of xenon lamp containing ultraviolet ray, under light source condition of incident angle of 45° and light receiving angle of 0°. There was also found a wave length (λ max) which showed maximum reflection rate.
[Color Measurement]

From the above-mentioned reflection spectrum, there were found tristimulus values (X, Y, Z) and chromaticity coordinates (x, y, z) by means of color measurement based on spectrocolorimetry specified in JIS Z8722-1994 of the Japanese Industrial Standards. For this measurement, there was employed a condition of standard light D65 and viewing filed of 2°.
[Weatherability Evaluation]

Samples to be evaluated were subjected to 3,000-hour exposure treatment with use of Atlas Weatherometer of Ci65A type manufactured by Toyo Seiki K.K., provided with 6.5 kW xenon lamp. Color measurement before and after test was conducted by visual observation, and, thus, the samples were graded as follows.

| | |
|---|---|
| AAA: | Only a little change was seen in color and fluorescent sense. |
| AA: | Color change was little while fluorescent sense disappeared. |
| A: | Fluorescent sense remained while color tone changed. |
| B: | Both color and fluorescent sense changed. |
| C: | Color faded and whitened. |

Figure 3:
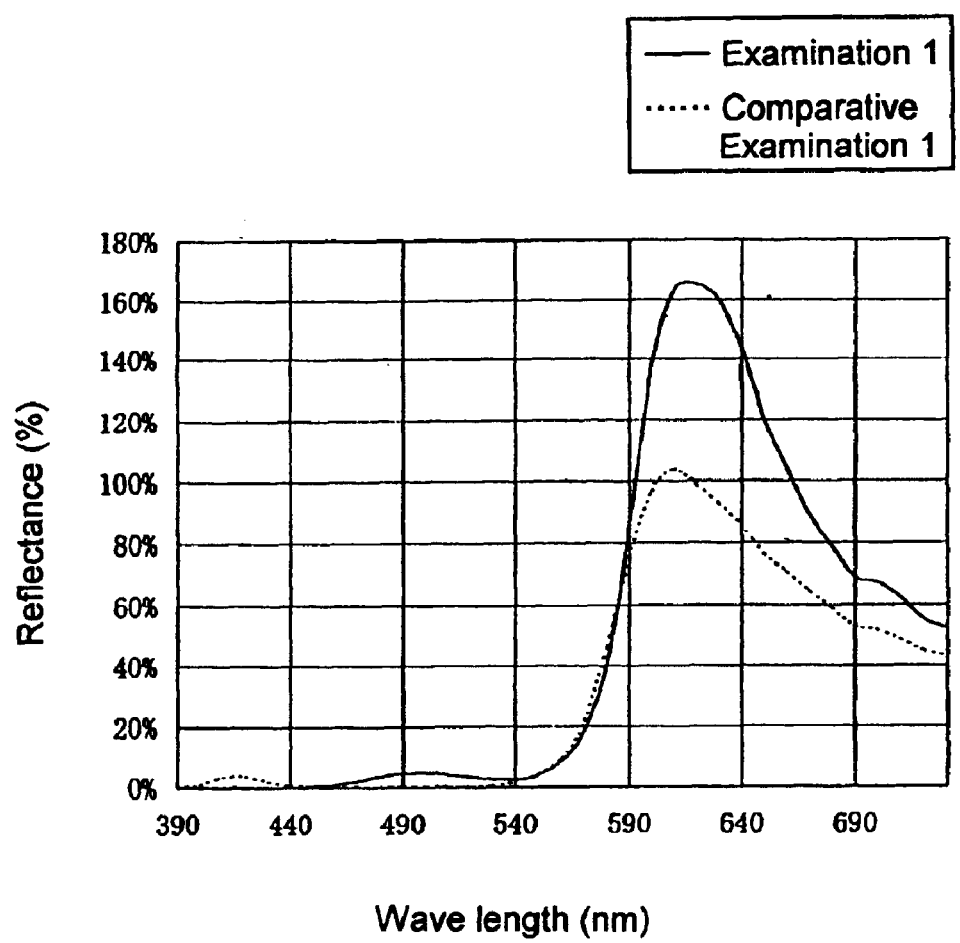
FIG. 3 is a chart which shows the result of measurement of reflection spectrum of fluorescent retroreflective sheeting of Example 1 and Comparative Example 1.

Table 3 shows color measurement values and evaluation of weatherability of fluorescent cube-corner type retroreflective sheeting of the above-mentioned Example 1 and Comparative Example 1. FIG. 3 shows measurement results of reflection spectrum. In Example 1, maximum reflection wave-length was 620 nm, and maximum reflection rate was 165%. In Comparative Example 1, maximum reflection wave-length was 610 nm, and maximum reflection rate was 104%.

TABLE 3

| | Example 1 | Comparative Example 1 |
|---|---|---|
| λ max (nm) | 620 | 610 |
| Maximum reflection rate (%) | 165 | 104 |
| X | 69.48 | 48.58 |
| Y | 39.83 | 29.30 |
| Z | 1.49 | 0.91 |
| x | 0.627 | 0.617 |
| y | 0.359 | 0.372 |
| z | 0.013 | 0.012 |
| Evaluation of weatherability | AA | A |

As mentioned above, the reflection spectrum of fluorescent cube-corner type retroreflective sheeting of this invention showed much higher maximum reflection rate than the retroreflective sheeting of Comparative Example 1. Y value, which indicates the lightness (clarity) of sheeting, of the sheeting of this invention was 39.83, which was much larger than 29.30 of Comparative Example 1. The sheeting of this invention was excellent also in color change after weatherability test.

What is claimed is:

1. Encapsulated type fluorescent retroreflective sheeting which comprises a surface-protective layer disposed on the side on which light is to strike, a binder layer connected to the surface-protective layer through network bonding parts, an air layer which is sealed-up by the network bonding parts between the surface-protective layer and the binder layer, and a retroreflective element layer disposed between the surface-protective layer and the air layer, or between the binder layer and the air layer, wherein at least one layer located on the light-incident side of sealed-up air layer contains at least one fluorescent dye selected from the group consisting of benzimidazole coumarin type-fluorescent dyes of formula (1) as follows:

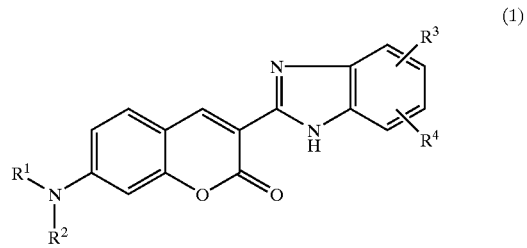

(1)

wherein $R^1$ and $R^2$ each denote hydrogen atom, alkyl group, allyl group, cycloalkyl group, cyclohexylphenyl group or alkylphenyl group; and $R^3$ and $R^4$ each denote hydrogen atom, halogen atom, alkyl group or alkoxy group, and benzopyran type-fluorescent dyes of formula (2) as follows:

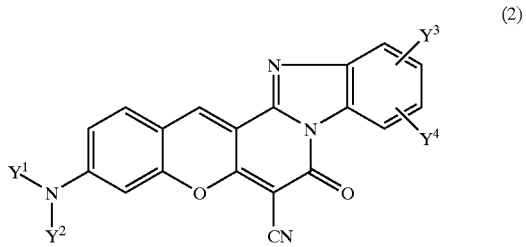

(2)

wherein $Y^1$ and $Y^2$ each denote hydrogen atom, cyano group, alkyl group, alkoxy group, allyl group, allyloxy group, carboalkoxy group, acetoxy-substituted alkyl group, cycloalkyl group or phenyl group; and $Y^3$ and $Y^4$ each denote hydrogen atom, halogen atom, alkoxy group, cyano group or nitro group.

2. Fluorescent retroreflective sheeting of claim 1 wherein the benzimidazole coumarin type-fluorescent dye of formula (1) is a yellow fluorescent dye of formula (1) wherein $R^1$ and $R^2$ each denote ethyl group and $R^3$ and $R^4$ each denote hydrogen atom.

3. Fluorescent retroreflective sheeting of claim 1 wherein the benzopyran type-fluorescent dye of formula (2) is a red fluorescent dye of formula (2) wherein $Y^1$ and $Y^2$ each denote allyl group and $Y^3$ and $Y^4$ each denote hydrogen atom.

4. Fluorescent retroreflective sheeting of claim 1 wherein at least one layer located on the light-incident side of sealed-up air layer contains said fluorescent dye in an amount of 0.01 to 0.5 PHR.

5. Fluorescent retroreflective sheeting of claim 1 wherein fluorescent dye-containing layer further contains a piperidine type hindered amine light stabilizer of tertiary amine structure which has a molecular weight of at least 600.

6. Fluorescent retroreflective sheeting of claim 5 wherein fluorescent dye-containing layer contains a piperidine type hindered amine light stabilizer in an amount 0 to 1 PHR.

7. Fluorescent retroreflective sheeting of claim 1 wherein retroreflective layer and/or surface-protective layer and/or fluorescent dye-containing layer include an ultraviolet absorber.

8. Fluorescent retroreflective sheeting of claim 7 wherein ultraviolet absorber is one of benzotriazole type or of benzophenone type.

9. Fluorescent retroreflective sheeting of claim 1 wherein retroreflective element layer comprises cube-corner type retroreflective elements.

10. Fluorescent retroreflective sheeting of claim 9 wherein cube-corner type retroreflective elements are triangular-pyramidal cube-corner retroreflective elements.

11. Fluorescent retroreflective sheeting of claim 1 wherein retroreflective element layer comprises micro glass beads type retroreflective elements.

12. Fluorescent retroreflective sheeting of claim 1 wherein resin which constitutes retroreflective element layer are polycarbonate resins, (meth)acrylic resins, vinyl chloride resins or urethane resins.

* * * * *

UNITED STATES PATENT AND TRADEMARK OFFICE
CERTIFICATE OF CORRECTION

PATENT NO. : 6,911,486 B2
DATED : June 28, 2005
INVENTOR(S) : Ikuo Mimura et al.

It is certified that error appears in the above-identified patent and that said Letters Patent is hereby corrected as shown below:

Column 4,
Line 33, "fluorescent" should read -- fluorescence --; and

Line 41, " 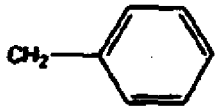 " should read -- 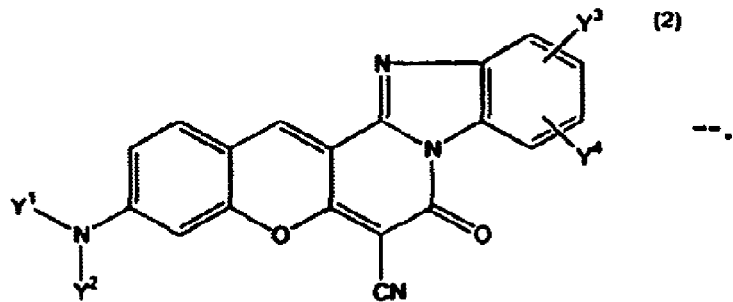 --.

Column 6,
Line 15, "-5,6dichlorobenzotriazole;" should read -- -5,6-dichlorobenzotriazole; --;
Line 19, "tertbutylphenyl)-" should read -- tert-butylphenyl)- --; and
Line 50 "708," should read -- -703, --.

Column 7,
Line 21, "—$C_{13}H_{22}$" should read -- —$C_{13}H_{27}$ --;
Line 40, "layer As" should read -- layer. As --; and
Line 46, "is" should read -- are --.

Column 11,
Line 21, "net-work" should read -- network --; and
Line 52, "filed" should read -- field --.

UNITED STATES PATENT AND TRADEMARK OFFICE
CERTIFICATE OF CORRECTION

PATENT NO. : 6,911,486 B2
DATED : June 28, 2005
INVENTOR(S) : Ikuo Mimura et al.

It is certified that error appears in the above-identified patent and that said Letters Patent is hereby corrected as shown below:

Column 14,
Line 7, "amount" should read -- amount of --.

Signed and Sealed this

Eighth Day of November, 2005

JON W. DUDAS
*Director of the United States Patent and Trademark Office*